Jan. 19, 1926.　　　　　　　　　　　　　　　　　　1,570,527
L. RONCA ET AL
COMBINED BUMPER AND FENDER
Filed July 5, 1924　　　2 Sheets-Sheet 1
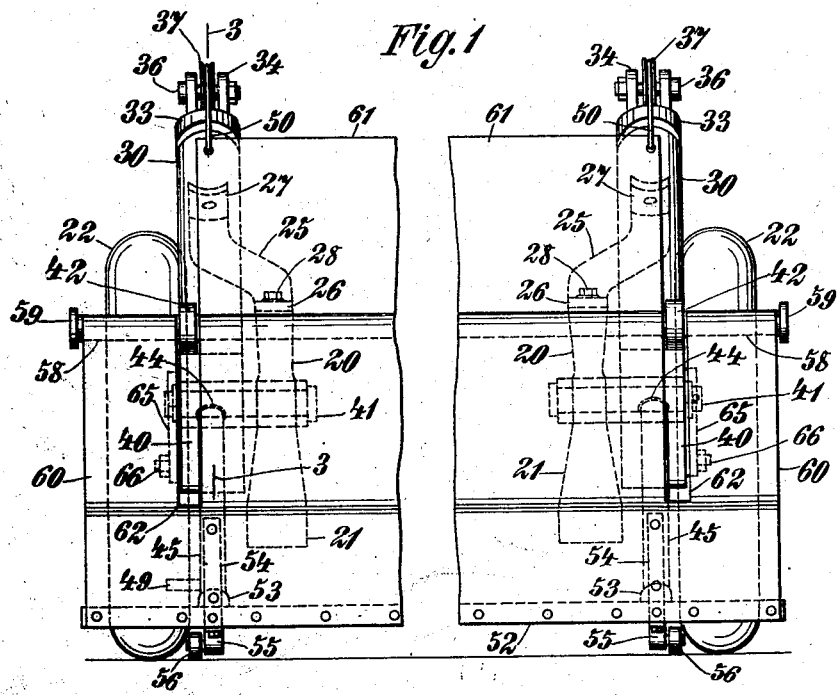
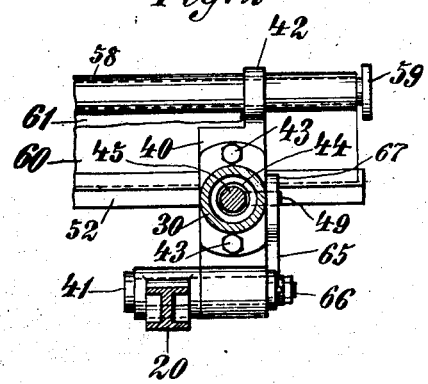
INVENTORS
Louis Ronca and
Stanislao Santoro.
BY
ATTORNEY

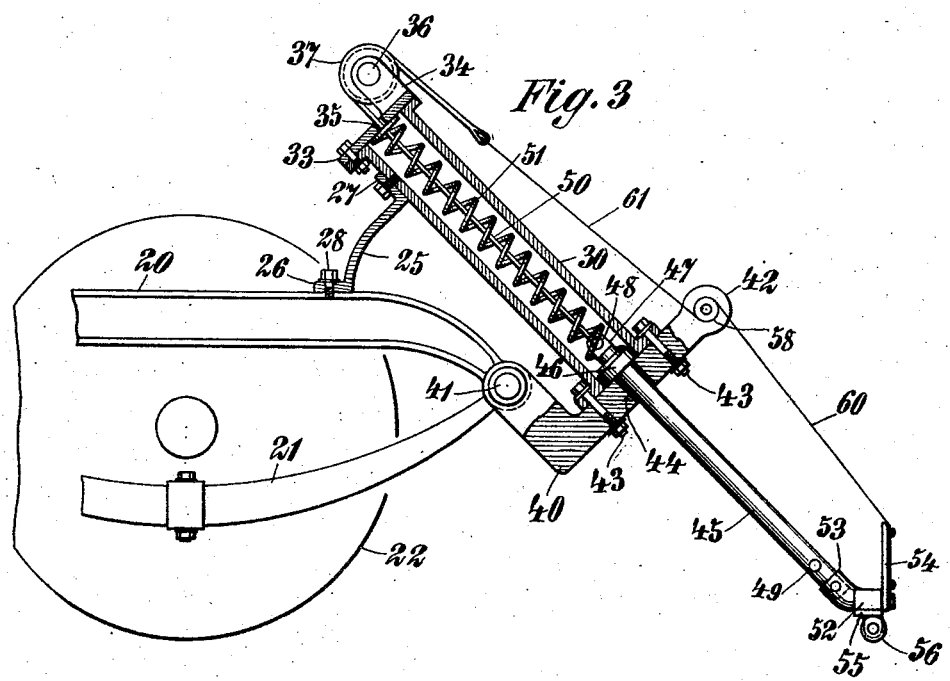
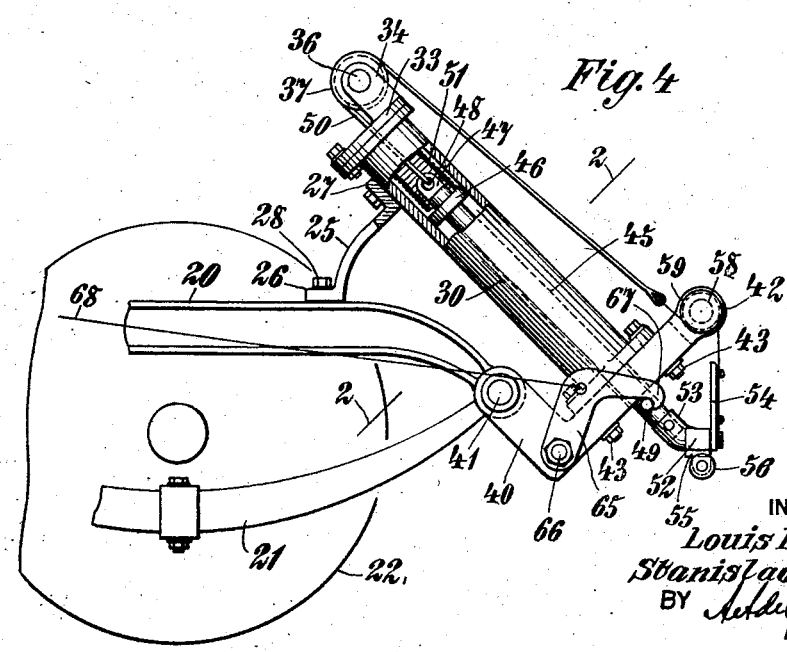

Patented Jan. 19, 1926.

1,570,527

UNITED STATES PATENT OFFICE.

LOUIS RONCA AND STANISLAO SANTORO, OF JERSEY CITY, NEW JERSEY, ASSIGNORS, BY DIRECT AND MESNE ASSIGNMENTS, TO BUMPER AND FENDER CO. INC., OF JERSEY CITY, NEW JERSEY, A CORPORATION OF NEW JERSEY.

COMBINED BUMPER AND FENDER.

Application filed July 5, 1924. Serial No. 724,317.

*To all whom it may concern:*

Be it known that we, LOUIS RONCA and STANISLAO SANTORO, respectively, a subject of the King of Italy and a citizen of the United States, and residents of Jersey City, in the county of Hudson and State of New Jersey, have invented certain new and useful Improvements in a Combined Bumper and Fender, of which the following is a specification.

This invention relates to a combined bumper and fender.

Its object is the production of a safety net, by means of which injury is prevented to persons that may be in the path of a vehicle. The second object of the invention is the production of a safety device for a vehicle which can quickly be located in operative position, either when said vehicle is at rest or in motion. Other objects of the invention will be apparent from the specification and drawings.

The organization of the invention comprises a spring actuated shade roller, which actuates a pair of curtains to unwind them therefrom, upon the release of a latch operated by the driver of the vehicle. The curtains when unwound constitute flexible supports or nets to catch a person that comes in the path of the vehicle when moving and safely carries said person, until the vehicle stops.

It is to be understood that various different objects that may be in the path of the vehicle are caught by the bumper and fender and thereby injury to the vehicle is prevented.

In the accompanying drawings Fig. 1 represents a front view of an exemplification of the combined bumper and fender in operative position; Fig. 2 shows a section on the line 2, 2 of Fig. 4; Fig. 3 is a partial left hand side view and partial section of Fig. 1 on the line 3, 3 and Fig. 4 is a view similar to Fig. 3 with movable parts in a different position.

A fragmentary portion of a vehicle in this instance is shown with a portion of the members 20 of a frame, the springs 21 and the front wheels 22. A pair of brackets 25 are each shown with the feet 26 and 27. The feet 26 are supported upon the members 20 of the frame, and fastened thereto by means of the studs 28. A pair of cylinders 30 have each their upper portions bolted to one of the feet 27 of the brackets 25. A cap 33 having the pair of journal lugs 34 and the axial guide opening 35, is bolted to the upper end of each of the cylinders 30. A shaft 36 is journaled in each pair of lugs 34 and has fastened thereto the guide pulley 37. A supporting bracket 40 is pinned to each of the members 20 of the frame by means of the pin 41. Each of the brackets 40 has formed therewith at its upper end the journal lug 42, and has bolted thereto at its lower end the cylinder 30, by means of the bolts 43. Each of the brackets 40 has formed therein the guide opening 44. A plunger 45 is guided in each of the openings 44 and has formed at its upper end the guide collar 46, having the lug 47 with the opening 48. At the lower end of each plunger 45 is indicated the latch pin 49. A pair of wire ropes 50 has each one end fastened to the lug 47, extends from the latter through the opening 35 of the cap 33, and is led over the guide pulley 37. A spring 51 is located in each of the cylinders 30 and bears between the cap 33 and the collar 46.

A bumper 52 has extending from its inner side the tubular brackets 53, to which latter are secured the lower ends of the plungers 45. A pair of supporting bars 54 are fastened to the bumper 52. A pair of journal brackets 55 are fastened to the lower face of the bumper 52, and have journaled thereto the rollers 56.

A spring actuated shade roller 58 having the end disc flanges 59, and similar to those in common use is journaled in the journal lugs 42. A pair of canvas curtains 60 and 61 have each one end fastened to the shade roller 42. The curtain 60 has formed therein the clearance openings 62, to clear the journal lugs 42 when rolling on or from the shade roller 58. The lower end of the curtain 60 is fastened to the supporting bars 54 and to the bumper 52. The upper end of the curtain 61 is fastened to the wire ropes 50.

A latch 65 is pivoted to each of the brackets 40 by means of the screw pivots 66, and has formed at its outer end the latch nose 67. The latter is adapted to lock with the latch pins 49. An operating rope 68 has one end fastened to each latch 65 and its other end leads to a convenient point for the operator in the vehicle.

The combined bumper and fender is shown in its closed position in Fig. 4 of the drawings, and it has been located in said closed position by manually raising the bumper 52 until the latch pins 49 are locked with the noses 67 of the latches 65. By this means the bumper is maintained in its raised position. While the bumper 52 is being raised the curtains 60 and 61 are simultaneously wound on the spring actuated shade roller 58. When it is desired to unwind the curtains 60 and 61 and lower the bumper 52 to the ground, the operating ropes 68 are pulled, which unlocks the latches 65 from the latch pins 49, and the springs 51 force down the plungers 45, whereby the curtains 60 and 61 are unwound from the shade roller 58. If the bumper 52 is lowered too near to the ground, the rollers 56 will contact therewith to prevent the breakage of the apparatus. When the curtains are unwound they will be located in proper operative position to hold and carry obstructions that may come in the path of the vehicle while it is moving forward and constitute a safety net.

It is to be noted that this invention can be used for automobiles, trolley cars and various other vehicles.

Various modifications may be made in the invention and the present exemplification is to be taken as illustrative and not limitative thereof.

Having described our invention what we desire to secure by Letters Patent and claim is:—

1. In a bumper and fender the combination of a cylinder supported on a vehicle, a plunger adapted to reciprocate in and extending through one end of the cylinder, means to move the plunger through said end of the cylinder, a bumper connected to the lower end of the plunger, a spring actuated shade roller journaled adjacent to the cylinder, a pair of curtains with one end of each connected to the shade roller, the other end of one curtain connected to the bumper and the other end of the other curtain in connection with the other end of the plunger and means to detachably lock the plunger in its raised position.

2. In a bumper and fender the combination of a pair of cylinders supported on a vehicle, a plunger adapted to move in and extending through the lower end of each cylinder, means bearing against each plunger to move it out of its cylinder, a bumper connected to the lower ends of the plungers, a spring actuated shade roller journaled adjacent to the cylinders, a pair of curtains with one end of each connected to the shade roller, the other end of one curtain connected to the bumper and the other end of the other curtain in connection with the other ends of the plungers and means to lock the plungers in their raised position.

3. In a bumper and fender the combination of a cylinder supported on a vehicle, a plunger extending through one end of the cylinder, a spring bearing between the other end of the cylinder and the top end of the plunger, a rope extending from the top end of the plunger and leading through the other end of the cylinder, a bumper connected to the lower end of the plunger, a spring actuated shade roller journaled adjacent to the lower end of the cylinder, a pair of curtains coacting with the shade roller with one end of each fastened to the roller, the other end of one curtain fastened to the bumper and the other end of the other curtain fastened to said rope and means to detachably lock the plunger in its raised position in said cylinder.

4. In a bumper and fender the combination of a pair of cylinders supported on a vehicle, a plunger extending through the lower end of each cylinder, a latch pin extending from the lower end of each of the plungers, a spring in each cylinder bearing between the top end of each cylinder and the top end of each plunger, a bumper connected to the lower ends of the plungers, a spring actuated shade roller journaled adjacent to the lower ends of the cylinders, a pair of curtains with one end of each connected to the shade roller, a rope fastened to the upper end of each plunger and extending up and through each cylinder, the other ends of said ropes connected to one of said curtains, one end of the second curtain fastened to said bumper, a latch pivoted adjacent to the lower end of each of the cylinders adapted to actuate with said latch pins and an operating rope for said latches.

5. In a bumper and fender the combination of a pair of supporting brackets pinned to the front end of the frame of a vehicle, each of said brackets having a journal lug formed therewith, a pair of cylinders each with their lower ends supported upon and fastened to one of said brackets, a plunger extending through the lower end of each cylinder and through openings in its bracket, a latch pin extending from the lower end of each of the plungers, a cap with an axial guide opening and a pair of journal lugs fastened to the top end of each cylinder, a guide pulley journaled in the lugs of each cap, a spring in each cylinder bearing between its cap and the top end of its plunger, a bumper connected to the lower ends of the plungers, a spring actuated shade roller journaled in the journal lugs of the supporting brackets, a pair of curtains with one end of each fastened to the shade roller, a rope fastened to the upper end of each plunger and extending up and through the guide opening of the cap of its cylinder and over the guide pulley of the cap, the other ends of said ropes connected to one end of one of said curtains, one end of the second curtain fastened to said bumper, a latch pivoted to each of said supporting brackets adapted to actuate with said latch pins extending from each of the plungers and an operating rope for each latch.

Signed at Jersey City, in the county of Hudson and State of New Jersey, this 21st day of June A. D. 1924.

LOUIS RONCA.
STANISLAO SANTORO.